United States Patent
Kuno

(10) Patent No.: US 8,388,080 B2
(45) Date of Patent: Mar. 5, 2013

(54) RECORDING CONTROL SYSTEM

(75) Inventor: Masashi Kuno, Obu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 335 days.

(21) Appl. No.: 12/710,761

(22) Filed: Feb. 23, 2010

(65) Prior Publication Data

US 2010/0214342 A1 Aug. 26, 2010

(30) Foreign Application Priority Data

Feb. 25, 2009 (JP) ................................. 2009-042815

(51) Int. Cl.
*B41J 29/38* (2006.01)
(52) U.S. Cl. .................. 347/5; 347/9; 347/12
(58) Field of Classification Search .................. 347/5, 9, 347/12, 14, 15, 19
See application file for complete search history.

(56) References Cited

U.S. PATENT DOCUMENTS

| | | |
|---|---|---|
| 2001/0024218 A1 | 9/2001 | Inui et al. |
| 2002/0158942 A1 | 10/2002 | Kaneko et al. |
| 2002/0171709 A1 | 11/2002 | Teshigawara et al. |
| 2006/0227238 A1 | 10/2006 | Kuroki et al. |

FOREIGN PATENT DOCUMENTS

| | | |
|---|---|---|
| JP | H10-157087 A | 6/1998 |
| JP | 2000-190470 A | 7/2000 |
| JP | 2001-180017 A | 7/2001 |
| JP | 2001-180018 A | 7/2001 |
| JP | 2002-248798 A | 9/2002 |
| JP | 2003-034021 A | 2/2003 |
| JP | 2004-050705 A | 2/2004 |
| JP | 2004-249469 A | 9/2004 |
| JP | 2006-293009 A | 10/2006 |

OTHER PUBLICATIONS

Japan Patent Office, Office Action for Japanese Patent Application No. 2009-042814 (counterpart to co-pending U.S. Appl. No. 12/711,242), mailed Dec. 14, 2010.
Japan Patent Office, Office Action for Japanese Patent Application No. 2009-042815 (counterpart to above-captioned patent application), mailed Dec. 14, 2010.

*Primary Examiner* — Lam S Nguyen
(74) *Attorney, Agent, or Firm* — Baker Botts L.L.P.

(57) ABSTRACT

In a recording control system, the selecting unit selects at least one pixel from among the pixels in the detection region such that a number of the selected at least one pixel is smaller than a total number of the pixels in the detection region. The determining unit determines whether a pixel value of the selected pixel satisfies a criterion. The recording head ejects ink based on pixel data of the first region while scanning in the first direction. The recording head ejects ink based on pixel data of the second region adjacent to the first region while scanning in the first direction when the pixel value of the selected at least one pixel satisfies the criterion. The recording head ejects ink based on pixel data of the second region while scanning in the second direction when the pixel value of the selected pixel does not satisfy the criterion.

10 Claims, 11 Drawing Sheets

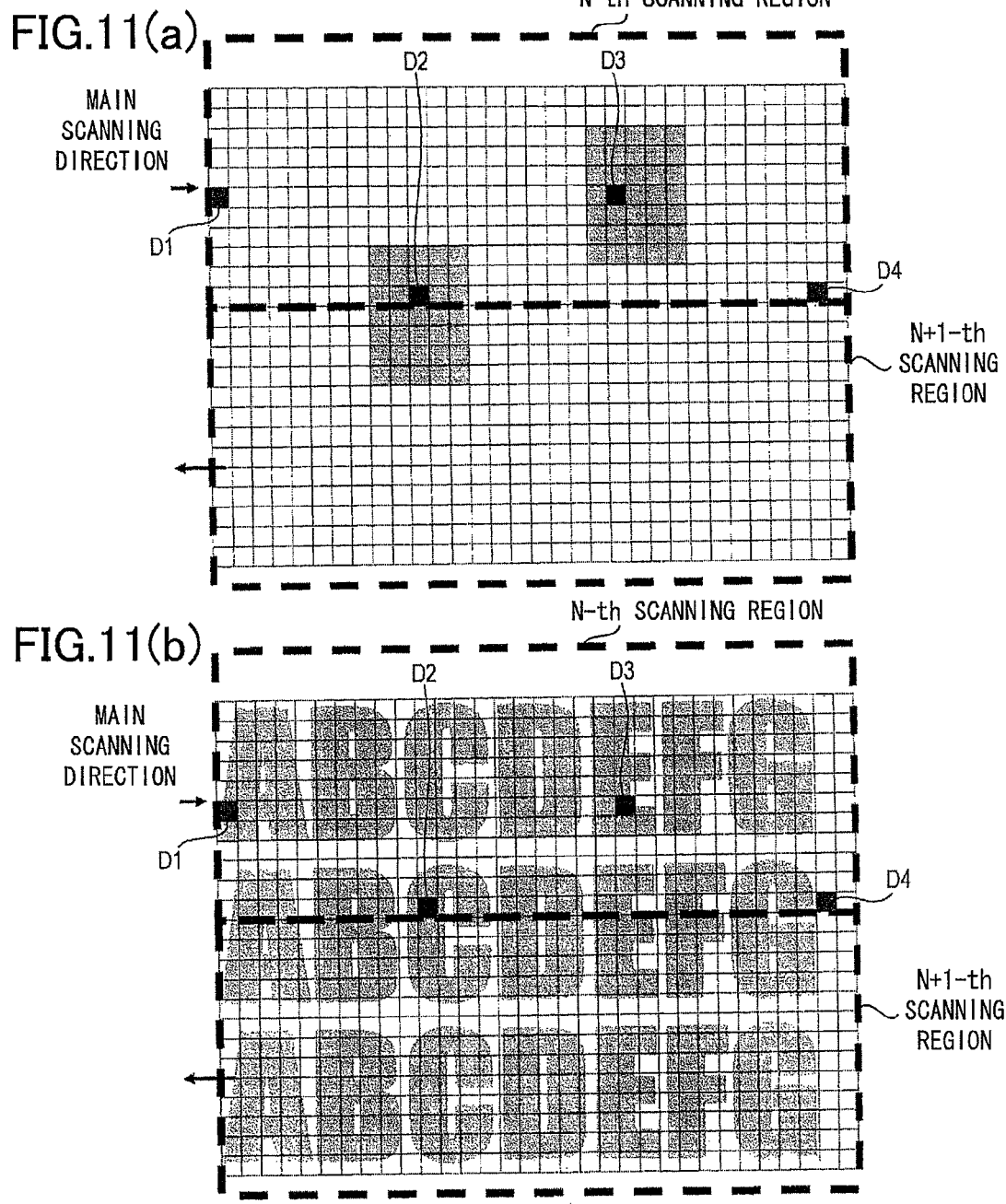

MAIN SCANNING DIRECTION

MAIN SCANNING DIRECTION

RECORDING CONTROL SYSTEM

CROSS REFERENCE TO RELATED APPLICATION

This application claims priority from Japanese Patent Application No. 2009-042815 filed Feb. 25, 2009. The entire content of the priority application is incorporated herein by reference.

TECHNICAL FIELD

The present invention relates to a recording control system for controlling inkjet record.

BACKGROUND

An inkjet recording device provided with a recording head having a plurality of nozzle rows corresponding to a plurality of ink colors is well known in the art. The device records an image represented in image data by reciprocating the recording head while ejecting ink from the nozzle rows based on the image data.

In order to improve the speed at which images are recorded, this type of inkjet recording device may perform bi-directional recording in which an image is recording by ejecting ink from the recording head in both a forward direction and a reverse direction of the reciprocal motion. Here, the different sequences in which the colors of ink are superposed between the forward scan and reverse scan can lead to irregularities in color (referred to as "color banding"). However, since the degree in which such color banding is noticeable depends on the image, a method has been proposed for recording areas of an image in which color banding would be more noticeable by single-direction recording.

Specifically, for each region of an image that is recorded in either one forward scan or one reverse scan of the recording head (hereinafter referred to as a "scanning region"), the conventional recording device employing the above method determines whether the image in any portion of this scanning region is susceptible to noticeable color banding. The device performs bi-directional recording when determining that the scanning region has no areas in which color banding is noticeable, and performs single-direction recording when determining that the scanning region has areas in which color banding may be noticeable. More specifically, the recording device scans the image data within two detection areas (windows) of the scanning region to detect an image with a high quantity of ink (a high recording duty) and calculates the ink quantity within the detection areas at each scanning position of the window. Based on these calculations, the recording device performs bi-directional recording when there exists no detection areas having an ink quantity greater than a reference value and performs single-direction recording when there exists even one such detection area.

SUMMARY

However, in order to calculate a characteristic value (ink quantity in this example) of an image in the detection area, the conventional inkjet recording device described above requires a longer process time.

In order to attain the above and other objects, the invention provides a recording control system. The recording control system controls an inkjet recording operation for recording an image by controlling a recording head based on image data indicating the image. The recording head has a plurality of nozzle rows and is configured to be capable of scanning in a first direction and a second direction opposite to the first direction. The plurality of nozzle rows corresponds to a plurality of colors. Each nozzle row includes a plurality of nozzles that are arranged in a direction intersecting with the first and second directions and that are configured to eject ink of corresponding color. The image includes a plurality of pixels. The image data has a plurality of sets of pixel data corresponding to the plurality of pixels. Each set of pixel data includes a pixel value representing color of a corresponding pixel and indicates an amount of ink of the color. The recording control system includes a setting unit, a selecting unit, a determining unit, and a control unit. The setting unit sets, in the image, a first region and a second region adjacent to the first region and sets a detection region in one of the first and second regions. The selecting unit selects at least one pixel from among the pixels in the detection region such that a number of the selected at least one pixel is smaller than a total number of the pixels existing in the detection region. The determining unit determines whether a pixel value of the selected at least one pixel satisfies a criterion. The control unit controls the recording head to eject ink based on pixel data corresponding to pixels in the first region while controlling the recording head to scan in the first direction such that the recording head records the image in the first region. The control unit controls the recording head to eject ink based on pixel data corresponding to pixels in the second region while controlling the recording head to scan in the first direction such that the recording head records the image in the second region when the determining unit determines that the pixel value of the selected at least one pixel satisfies the criterion. The control unit controls the recording head to eject ink based on pixel data corresponding to pixels in the second region while controlling the recording head to scan in the second direction such that the recording head records the image in the second region when the determining unit determines that the pixel value of the selected at least one pixel does not satisfy the criterion.

BRIEF DESCRIPTION OF THE DRAWINGS

The particular features and advantages of the invention as well as other objects will become apparent from the following description taken in connection with the accompanying drawings, in which:

FIG. 8($b$) is an explanatory diagram illustrating a method to randomly reduce the number of representative pixels;

FIG. 11(a) is an explanatory diagram illustrating an example of erroneous judgment when the determination method shown in FIG. 10 is performed;

FIG. 11(b) is an explanatory diagram illustrating another example of erroneous judgment when the determination method shown in FIG. 10 is performed;

DETAILED DESCRIPTION

1. Whole Structure

A communication system 100 according to an embodiment will be described.

1-1. Overall Structure of the Communication System 100

Figure 1:
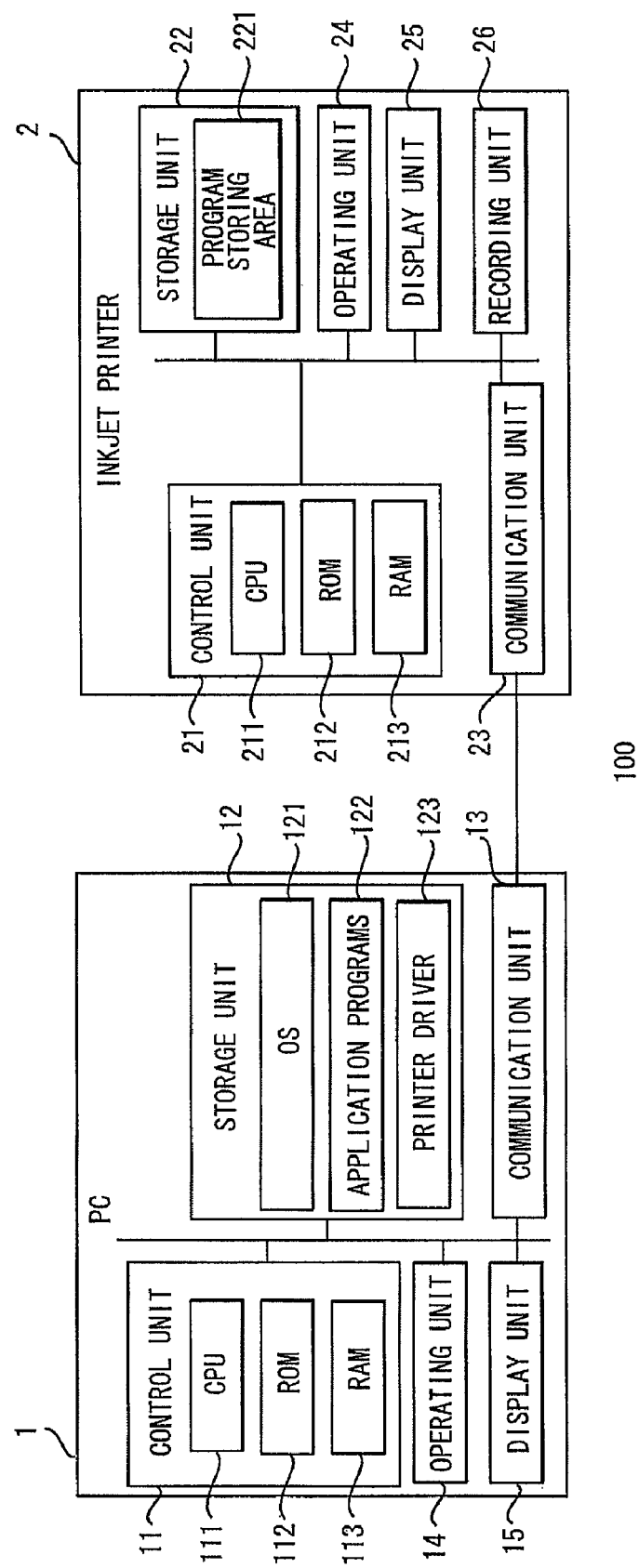
FIG. 1 is a block diagram showing an overall structure of a communication system according to an embodiment.

FIG. 1 is a block diagram showing the overall structure of the communication system 100 according to the embodiment. As shown in FIG. 1, the communication system 100 includes a personal computer (PC) 1 and an inkjet printer 2.

The PC 1 is a data processor that includes a control unit 11, a storage unit 12, a communication unit 13, an operating unit 14, and a display unit 15.

The control unit 11 comprehensively controls each unit in the PC 1. The control unit 11 includes a CPU 111, a ROM 112, and a RAM 113.

The storage unit 12 is a nonvolatile storage device that allows stored data to be overwritten. In the embodiment, a hard disk drive is used as the storage unit 12. Various programs are installed on the storage unit 12, including an operating system (OS) 121, application programs 122 such as an image-browsing program, and a printer driver 123, which is a software program that enables the PC 1 to use the inkjet printer 2.

The communication unit 13 is an interface for performing data communications with the inkjet printer 2.

The operating unit 14 is an input device that enables a user to input commands through external operations. In the embodiment, a keyboard and a pointing device such as a mouse or a touchpad are used as the operating unit 14.

The display unit 15 is an output device for displaying various data to the user as visible images. In the embodiment, a liquid crystal display is used as the display unit 15.

The inkjet printer 2 is an inkjet type recording device (printer) and includes a control unit 21, a storage unit 22, a communication unit 23, an operating unit 24, a display unit 25, and a recording unit 26.

The control unit 21 comprehensively controls each unit in the inkjet printer 2. The control unit 21 includes a CPU 211, a ROM 212, and a RAM 213.

The storage unit 22 is a nonvolatile storage device that allows storage data to be overwritten. In the embodiment, flash memory is used as the storage unit 22. The storage unit 22 includes a program storing area 221 that stores a recording control program that the CPU 211 executes in order to perform a recording control process described later.

The communication unit 23 is an interface for implementing data communications with the PC 1.

The operating unit 24 is an input device that allows a user to input commands through external operations. The operating unit 24 includes various operating buttons.

The display unit 25 is an output device for displaying various data to the user as visible images. In the embodiment, a small liquid crystal display is used as the display unit 25.

The recording unit 26 functions to record (print) color images by ejecting ink droplets in the colors cyan (C), magenta (M), yellow (Y), and black (K) onto paper or another recording medium.

Figure 2:
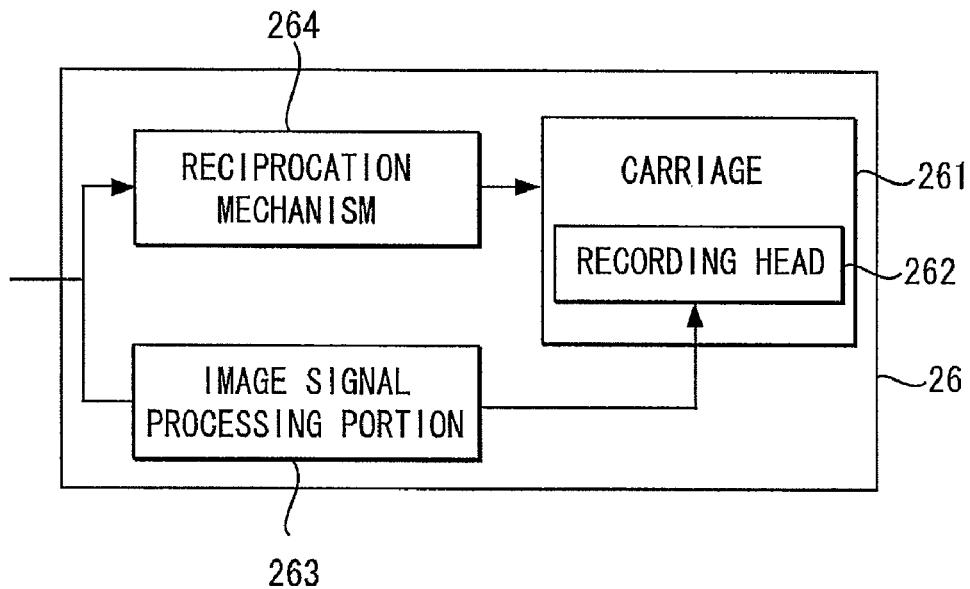
FIG. 2 is an enlarged view of a recording unit shown in FIG. 1.

More specifically, as shown in FIG. 2, the recording unit 26 includes a carriage 261, an image signal processing portion 263, and a reciprocation mechanism 264. The carriage 261 mounts a recording head 262. The reciprocation mechanism 264 moves the carriage 261 to reciprocate in a main scanning direction orthogonal to the paper conveying direction (sub-scanning direction). According to the reciprocation of the carriage 261, the recording head 262 reciprocates over a paper-conveying path along which sheets of paper are conveyed. The image signal processing portion 263 receives image signal from the control unit 21 and generates a control signal to control the recording head 262 and the reciprocation mechanism 264 based on the image signal. Here, the control unit 21 generates the image signal based on the image data.

Figure 3:
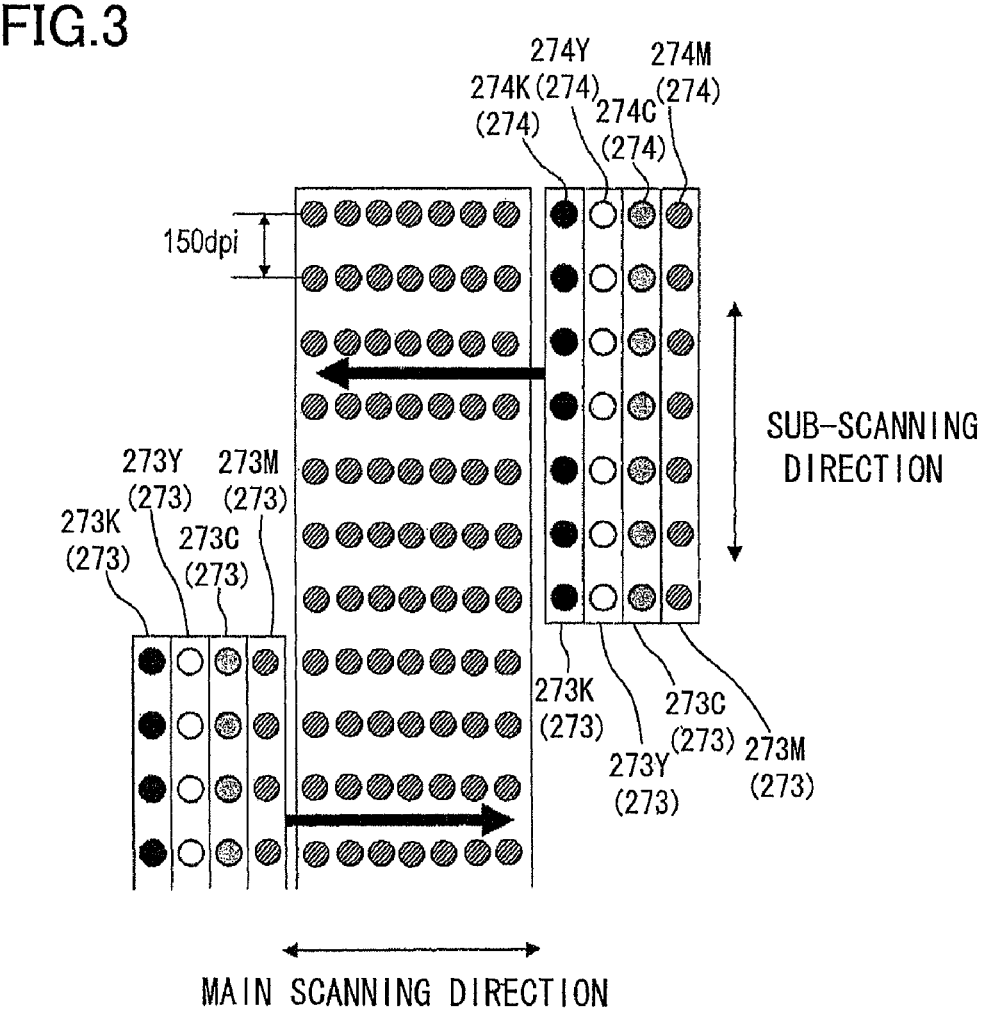
FIG. 3 is an explanatory diagram illustrating a configuration of a recording head.

As shown in FIG. 3, a plurality of nozzles 274 for ejecting ink is formed in the bottom surface of the recording head (the surface opposing the conveyed sheets of paper). The nozzles 274 (274C, 274M, 274Y, and 274K) are arranged in each of four nozzle rows 273 (273C, 273M, 273Y, and 273K). That is, each nozzle row 273 corresponding color (one of C, M, Y, and K colors) extends in the sub-scanning direction and the nozzles 274 for the corresponding color arranged in the sub-scanning direction. Four nozzle rows 274 are arranged in the main scanning direction and juxtaposed in the sub-scanning direction. In other words, nozzles 273 within the same nozzle row 274 eject ink of the same color. Specifically, the nozzles are arranged in nozzle rows 273 for ejecting ink in the respective colors C, M, Y, and K.

The recording unit 26 records an image represented by image data on paper by reciprocating the recording head 262 in the main scanning direction while ejecting ink droplets from nozzles in the nozzle rows 272C, 272M, 272Y, and 272K based on the image data. More specifically, image signal processing portion 263 performs an ink droplet control based on the control signal generated from the image signal. In the embodiment, the image signal includes multiple levels information (more than two levels information) indicating size of dot to be dropped, in order to render color shades more naturally. In the embodiment, by adjusting the quantity of the ink ejected among a plurality of levels, the recording unit 26 can render each pixel in four levels: no dot, small dot, medium dot, and large dot.

2. Overview of the Image Process

Next, an overview of the image process executed on the communication system 100 according to the embodiment will be described.

The printer driver 123 is launched when the user of the PC 1 performs an operation in a running application to initiate a printing operation. The printer driver 123 sequentially transmits image data for the print job (in the embodiment, 256-level image data expressed in the RGB color space) to the inkjet printer 2 in units of scanning regions, each scanning region including a plurality of recording lines.

Figure 4:
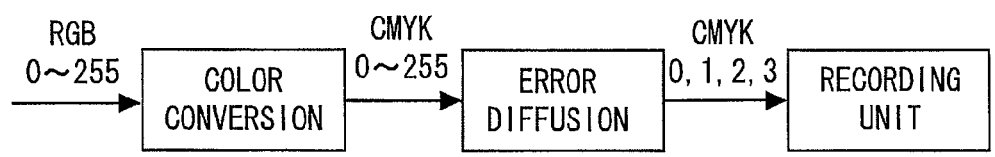
FIG. 4 is an explanatory diagram illustrating a conversion process performed in an inkjet printer.

As shown in FIG. 4, the inkjet printer 2 performs a color conversion process on the 256-level RGB data received from the PC 1. The color conversion process is performed to convert the RGB data to image data in the CMYK color space corresponding to the colors of ink used in the inkjet printer 2. Next, the inkjet printer 2 performs a halftone process (error diffusion process in the embodiment) on the 256-level CMYK image data produced from the above color conversion process in order to reduce the number of levels in the image data to four levels. The four-level CMYK data produced from this halftone process has level values that express a dot size (that is corresponding to an amount of ink to be dropped from the nozzle 274) for each color of each pixel in the image.

When this four-level CMYK image data is outputted to the recording unit 26, the recording unit 26 prints an image expressed by the image data on paper by ejecting ink based on the image data. The four-level CMYK image data indicates the amount of ink for respective color.

Figure 5:
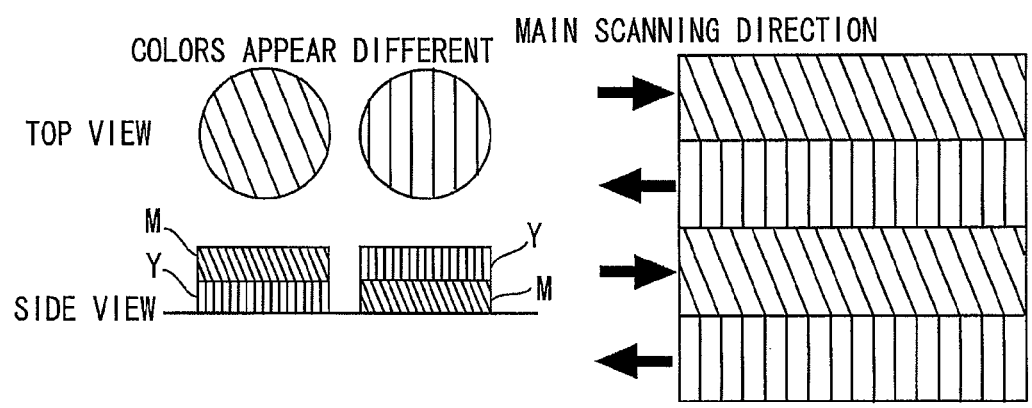
FIG. 5 is an explanatory diagram illustrating banding in an image.

Inkjet recording is performed bi-directionally, whereby ink is ejected while scanning the recording head 262 in both forward and reverse directions. Particularly, when performing bi-directional recording in which the recording head 262 alternately repeats one-pass forward recording and one-pass reverse recording, to record recording lines in the main scanning direction, the colors produced on the paper often differ between the forward scan and the reverse scan because, as illustrated in FIG. 5, the order in which the colors of ink are superposed differs. Thus, despite printing the same color based on the image data, the color may appear different depending on the scanning direction. Such color differences produced on paper are less noticeable in images (objects such as graphics and text) that fit within a single scanning region, but are more noticeable in images formed across a plurality of scanning regions due to the occurrence of color banding (hereinafter simply referred to as "banding"). Such banding becomes more noticeable as the size of the image increases.

Further, the degree to which banding is noticeable depends greatly on the quantity of ink used. Specifically, banding becomes more noticeable as the quantity of ink increases because there is considerably more ink overlap with a larger quantity of ink.

Figure 6:
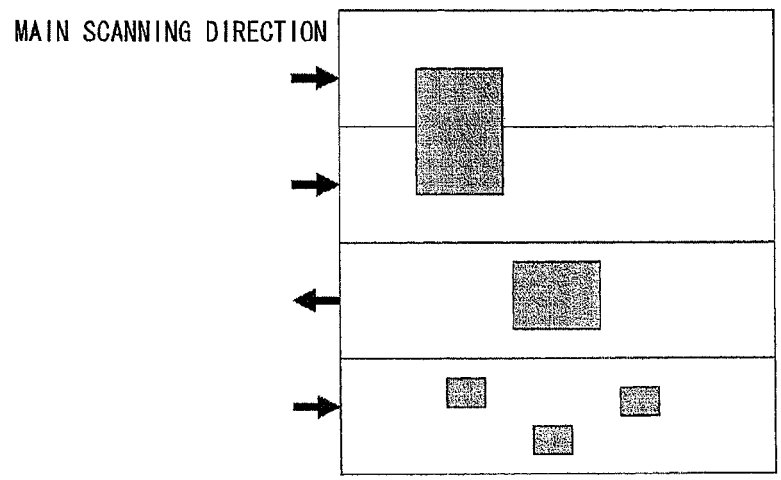
FIG. 6 is an explanatory diagram illustrating recording operation in which the recording head scans successive two scanning regions in a same direction.

In the inkjet printer 2 according to the embodiment, the conditions defining an image with noticeable banding (hereinafter referred to as a "banding image") are (1) an image greater than or equal to a reference size that is present in one scanning area (an $N^{th}$ scanning region) and adjacent to the border with the next scanning region to be recorded (an $(N+1)^{th}$ scanning region) and (2) the quantity of ink that is used to record the image is large (the quantity of ink that is used to record the image is larger than or equal to a prescribed value). Based on these conditions, the inkjet printer 2 determines for each scanning region whether a banding image exists in the scanning region and performs single-direction recording in which two scanning areas adjacent each other are recorded with the recording head 262 moving in the same direction, to prevent such banding when determining that a banding image exists. Hence, as illustrated in FIG. 6, the inkjet printer 2 performs single-direction recording only in areas where banding will be noticeable.

Figure 7:
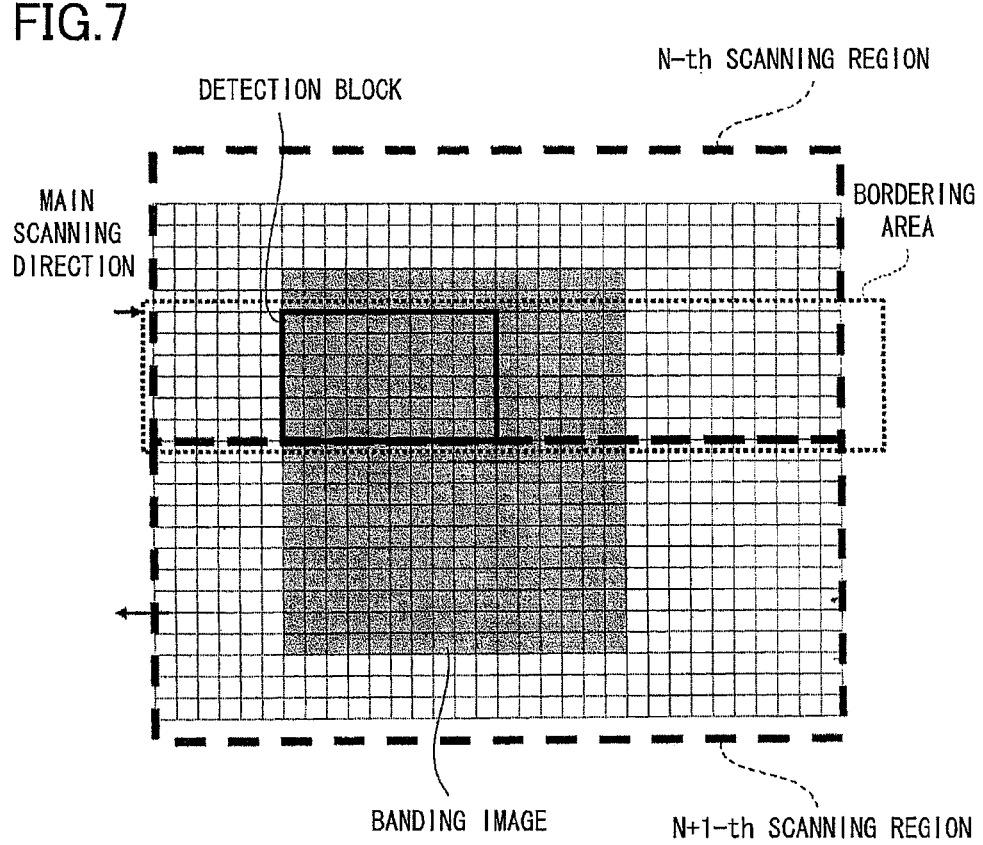
FIG. 7 shows a detection block set to a sample reference size.

In the above conditions, the "reference size" is an image size (defined for both horizontal and vertical dimensions) set to values predetermined in visual experiments for indicating that images of the same size or larger are susceptible to noticeable banding. FIG. 7 shows a detection block set to a sample reference size of 10 pixels horizontally by 6 pixels vertically. The reference size may be set such that a square or rectangle measuring 2-3 millimeters per side. In this case, since 3 millimeters is equivalent to 70 pixels when printing at 600 dpi resolution, it is necessary to reference pixel values for 4,900 pixels if the reference size is set to 3 mm².

When detecting banding images in an $N^{th}$ scanning region having a rectangular shape, the inkjet printer 2 performs detections in a plurality of detection blocks (only one is shown in FIG. 7) having the same size as the reference size so as to cover the entire length of the $N^{th}$ scanning region in the main scanning direction along the border with the $(N+1)^{th}$ scanning region, as shown in FIG. 7. That is, the inkjet printer 2 divides the $N^{th}$ scanning region into the plurality of detection blocks having rectangular shape. The plurality of detection blocks are arranged in the main scanning direction. In the embodiment, bottom side of the detection block coincides with the border line between the $N^{th}$ scanning region and the $(N+1)^{th}$ scanning region. The inkjet printer 2 determines that a banding image exists in the scanning region (the $N^{th}$ scanning region in this case) when even one of the plurality of detection blocks therein meets the above banding image conditions (the quantity of ink that is used to record the image is larger than or equal to the prescribed value). Through these determinations, the inkjet printer 2 can prevent banding by controlling the recording unit 26 to record the $(N+1)^{th}$ scanning region in the same scanning direction as the $N^{th}$ scanning region. In other words, the inkjet printer 2 detects a banding image by referencing pixels within a band-like region having the same vertical and horizontal dimensions as the reference size and positioned in the area of the $N^{th}$ scanning region that borders the $(N+1)^{th}$ scanning region (hereinafter this band-like region will be referred to as a "bordering area").

In a conceivable case when referencing all pixels within detection blocks to determine whether a banding image is present, the inkjet printer 2 ends up referencing all pixels within the entire bordering area when a banding image is not found, requiring a lengthy process time and increasing the amount of memory required for processing.

Figure 8A:
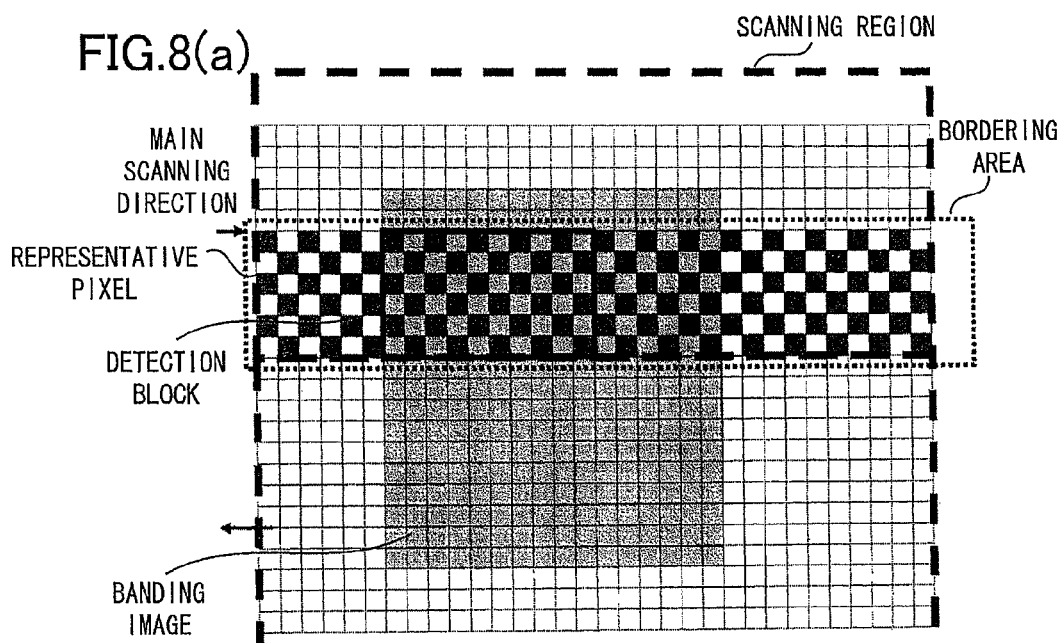
FIG. 8($a$) is an explanatory diagram illustrating a method to reduce the number of representative pixels.
Figure 8B:
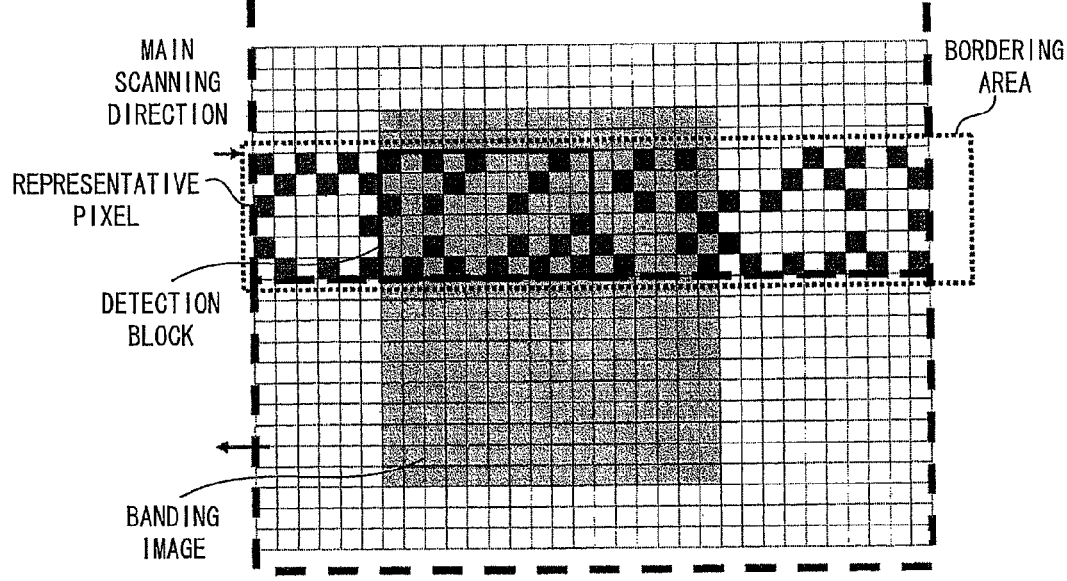

In order to reduce this process time, it is possible to reference just a portion of pixels in each detection block as representative pixels, rather than referencing all pixels. In other words, the inkjet printer 2 skips pixels within each detection block to reduce the number of pixels that are referenced. One possible method of skipping pixels uses the principles of ordered dithering that applies a checkerboard pattern, random pattern, or Bayer matrix, for example, to skip pixels in each detection block. When skipping pixels according to a checkerboard pattern, it is possible to reduce the number of referenced pixels by half, as illustrated in FIG. 8(*a*). When skipping pixels randomly, as in the example shown in FIG. 8(*b*), it is possible to skip any arbitrarily set number of pixels.

Figure 9:
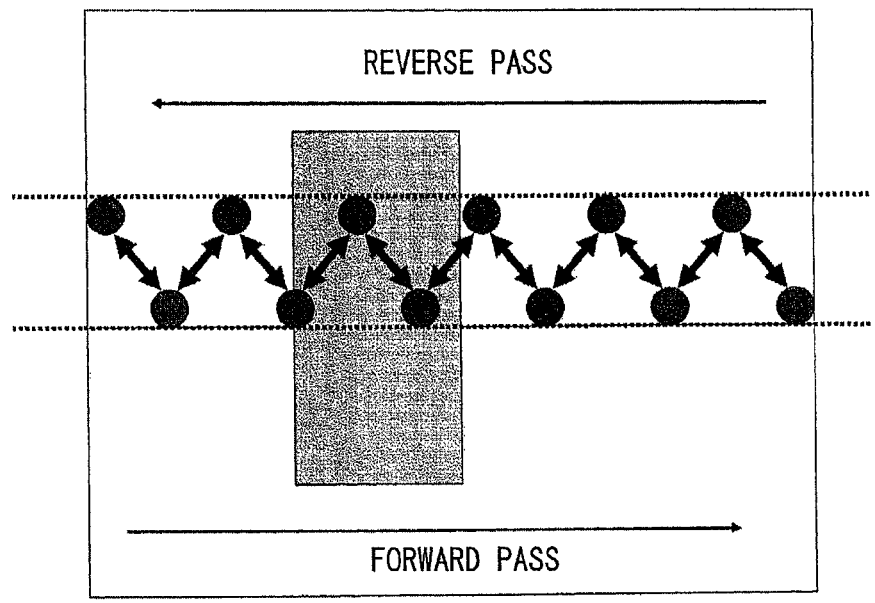
FIG. 9 is an explanatory diagram illustrating a determination method to determine a presence of a banding image by comparing pixel values for pairs of points.

For minimizing the process time, it is possible to maximize the number of skipped pixels, i.e., minimize the number of representative pixels. With this in mind, as shown in FIG. 9, it is possible to determine the presence of a banding image simply by comparing pixel values for pairs of points arranged along a diagonal. Specifically, representative pixels can be arranged in a zigzag pattern within the bordering area so that points in each neighboring pair are separated from each other both vertically and horizontally, as in the positional relationship of two opposing corners of a rectangle formed at the reference size (positions farthest from each other within a rectangle of the reference size).

When the pixel values at two diagonally opposing points among the representative pixels in this zigzag layout meet the conditions for a banding image (i.e., when the quantity of ink that is used to record the image is larger than or equal to a prescribed value), the inkjet printer 2 can assume these conditions have been met for all pixels within a region of the reference size formed with these two points serving as endpoints of a diagonal and can determine that a banding image exists in the corresponding scanning region.

Figure 10:
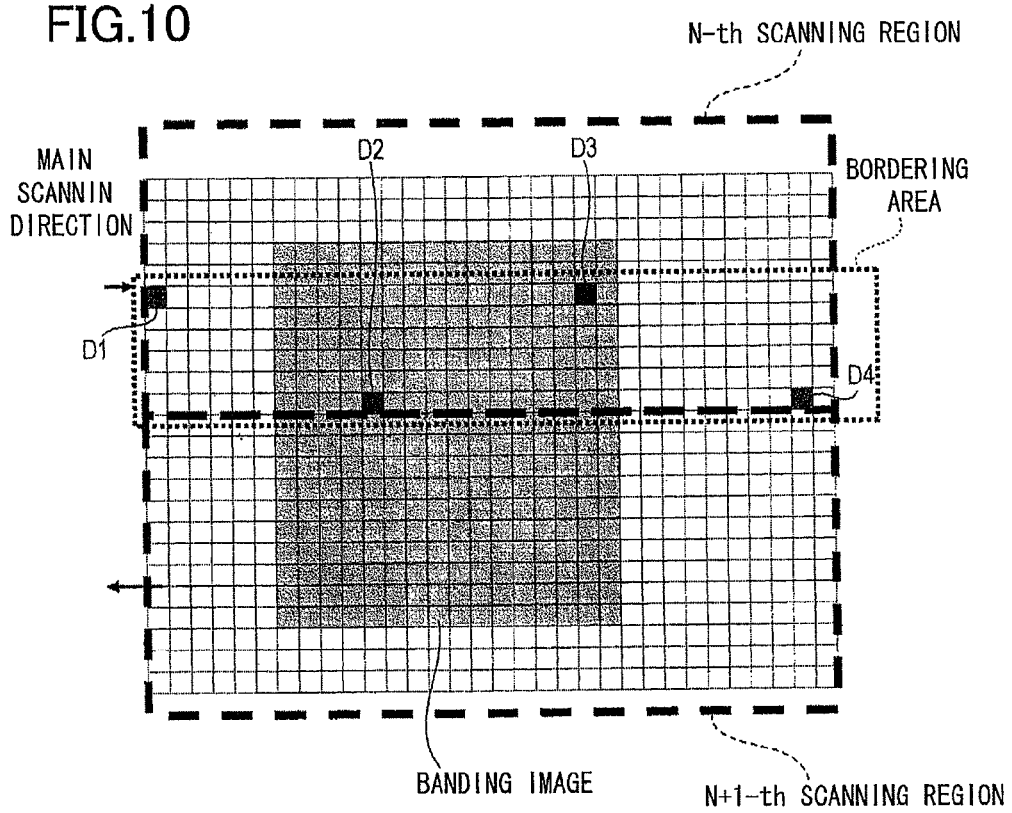
FIG. 10 is an explanatory diagram illustrating a concrete determination method to determine a presence of a banding image by comparing pixel values for pairs of points.

In the example shown in FIG. 10, four representative pixels D1-D4 are arranged in a zigzag pattern within a 31-pixel (horizontal)×6-pixel (vertical) region of a bordering area. That is, the four representative pixels D1-D4 are discretely positioned in the bordering area. Here, the inkjet printer 2 determines a presence of a banding image by respectively comparing pixels D1 and D2, pixels D2 and D3, and pixels D3 and D4. When determinations are performed in order beginning from the leftmost pair of pixels D1 and D2, the inkjet printer 2, in this example, detects a banding image in the second determination (D2 and D3), that is, the inkjet printer 2 anticipates that the banding image exists. Even in cases that a banding image is not detected, the inkjet printer 2 need only perform remaining three determinations. In other words, the inkjet printer 2 can determine the presence of a banding image in just three determinations for a 186-pixel (31-pixel (horizontal)×6-pixel (vertical)) region. Moreover, this method eliminates the need to increase the number of determinations when the bordering area is expanded somewhat in the vertical and horizontal directions.

However, it is conceivable that this method may lead the inkjet printer 2 to mistake a plurality of images (objects) smaller than the reference size as a single banding image, as illustrated in the examples of FIGS. 11(a) and 11(b). A larger number of such erroneous judgments would needless increase the ratio of single-direction recording operations, reducing recording speed.

Figure 12A:
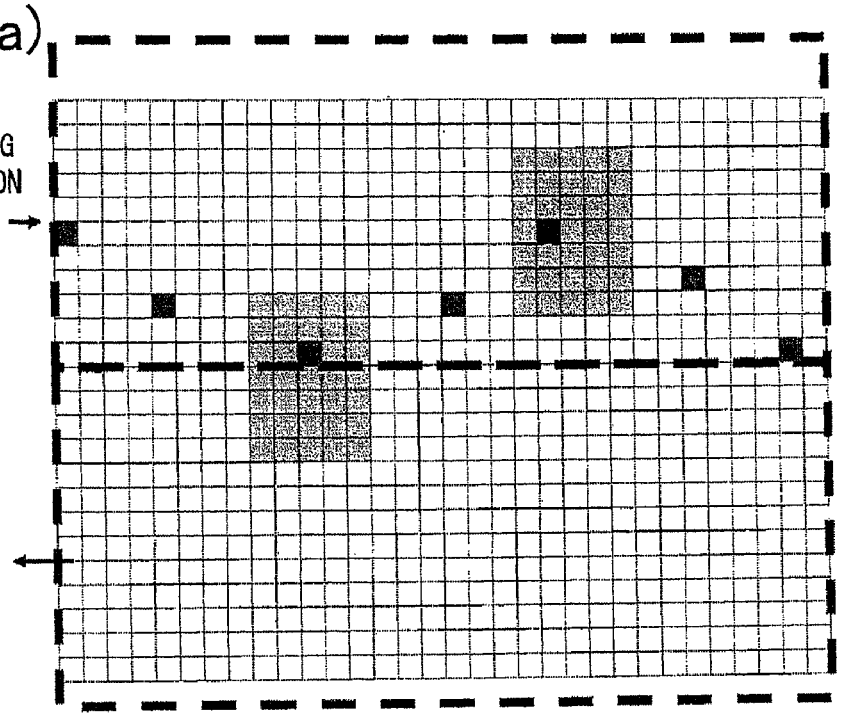
FIG. 12(a) is an explanatory diagram illustrating a determination method to determine a presence of a banding image by comparing pixel values for three points.
Figure 12B:
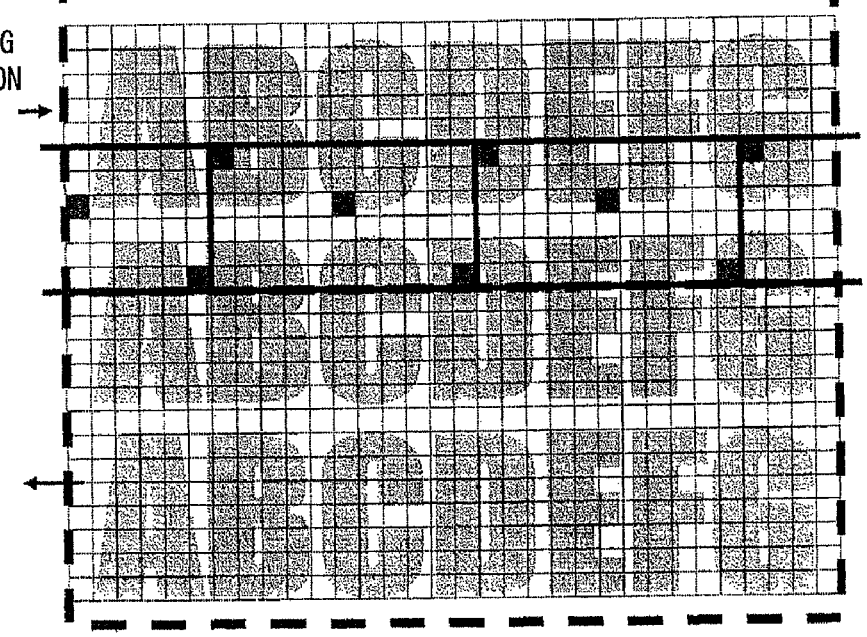
FIG. 12(b) is an explanatory diagram illustrating an example of erroneous judgment when the determination method shown in FIG. 12(a) is performed.

One possible method of decreasing the occurrence of such erroneous judgments is to add another representative pixel at an intermediate position between each pair of diagonally opposing pixels and to detect banding images through a comparison of three points at a time, as in the example shown in FIG. 12(a). While this method will lead to fewer errors than the method using two-point comparisons, the method is still susceptible to error in images having a plurality of densely packed images (objects), such as the character array shown in FIG. 12(b).

To summarize the above methods under consideration, it is not possible to reduce process time sufficiently when applying the method of skipping pixels in a checkerboard pattern because too many pixels are being referenced. Increasing the number of skipped pixels in a random skipping method may result in the skipping of pixels at points that are important for an accurate determination (points in the four corners, for example). Further, the potential for erroneous determinations is too high in a method that references only two points at a time.

Figure 13:
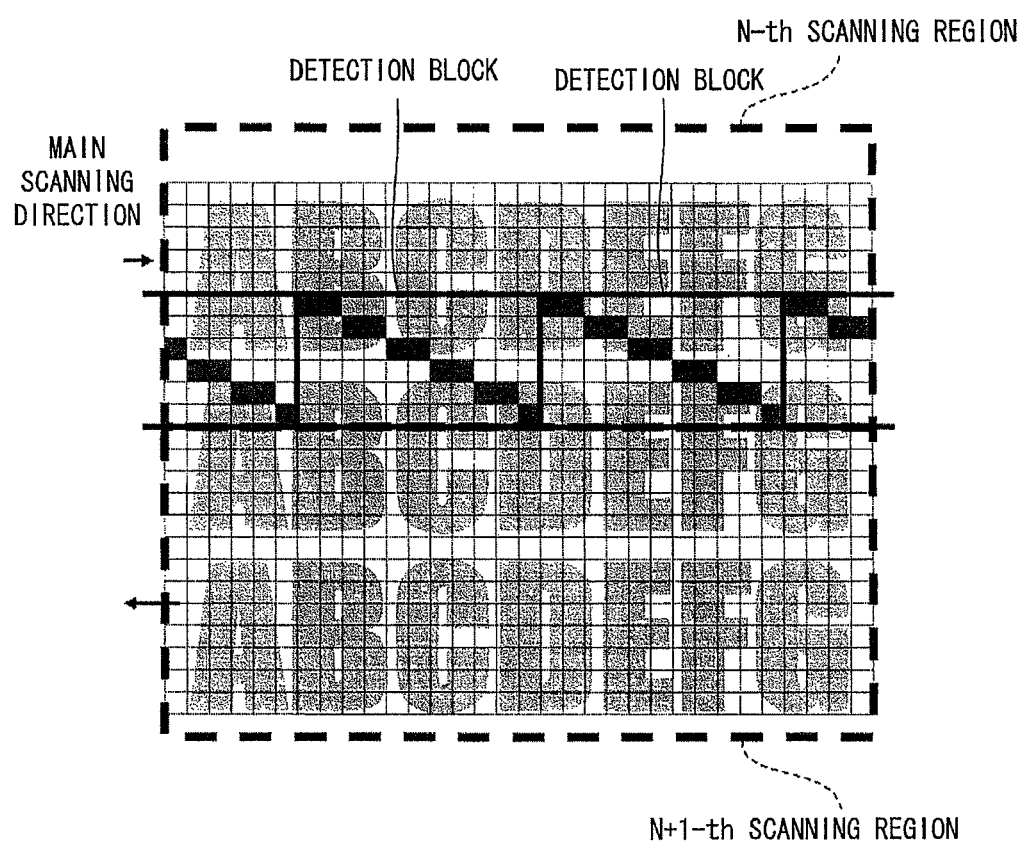
FIG. 13 is an explanatory diagram illustrating a determination method in which representative pixels are arranged along a diagonal line.

With consideration for these issues, as shown in FIG. 13, representative pixels are arranged continuously along diagonal line, as an example. This arrangement greatly reduces the potential for erroneous determinations, even in images having a plurality of densely arranged objects, such as character arrays, since the representative pixels are also positioned in spaces between characters or between lines.

The representative pixels may not necessarily need to be arranged in diagonal lines to achieve this effect. In the embodiment, the following conditions are required for the arrangement of the representative pixels: at least one representative pixel is positioned at each X coordinate and at least one representative pixel is positioned at each Y coordinate in the area targeted for banding image detection (the bordering area, and particularly the detection block when performing detections in blocks). It is likely that representative pixels can be positioned within spaces between characters and/or lines when the above conditions are satisfied. In other words, the control unit 21 sets the area targeted for banding image detection (the detection block in the embodiment) such that the X coordinate values and the Y coordinate values of all the pixels in the detection region are in an X detection range and in a Y detection range, respectively. The control unit 21 sets the representative pixels in the area targeted for banding image detection (the detection block) such that each X coordinate value in the X direction range is equal to the X coordinate value defining the position of at least one representative pixel and each Y coordinate value in the Y direction range is equal to the Y coordinate value defining the position of at least one representative pixel. Here, the number of the representative pixels is set smaller than the total number of the pixels in the detection blocks.

There are numerous arrangements of representative pixels that will meet these conditions. In the embodiment, the arrangement of the representative pixels requires that the representative pixels are distributed continuously. That is, in the embodiment, one representative pixel is located within 2 pixels from another representative pixel in the horizontal and the vertical directions in the area targeted for banding image detection (the detection block). Accordingly, erroneous determinations are less likely to occur when the representative pixels are distributed continuously than when distributed discretely since the inkjet printer 2 will determine that a banding image exists when there are continuous pixels that meet the conditions of pixels constituting a banding image.

Figure 14A:
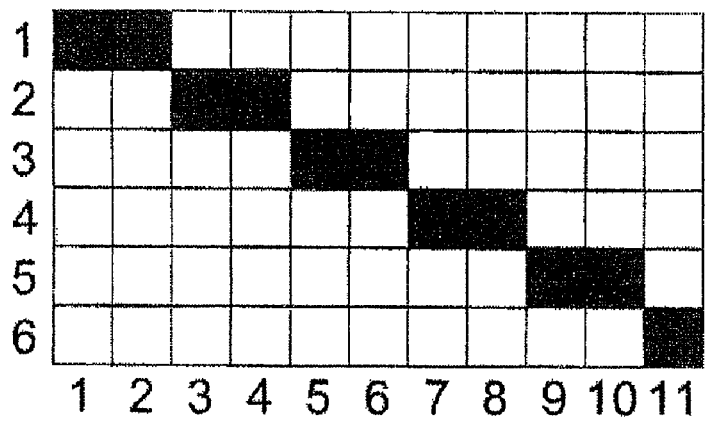
FIG. 14(a) is an example of a detection block in which representative pixels are arranged along a diagonal line.

An example of representative pixels arranged continuously is a diagonal line layout, such as that shown in FIGS. 13 and 14(a). By arranging representative pixels continuously along a single diagonal line within the detection block (an 11-pixel (horizontal)×6-pixel (vertical) block in this example), the existence of a banding image can be determined based not only on two vertices at diagonally opposing corners of the detection block (at positions having the maximum possible separation in the detection block), but also on pixels formed continuously between these two vertices. Hence, this determination will further reduce the likelihood of erroneous detections.

Figure 14B:
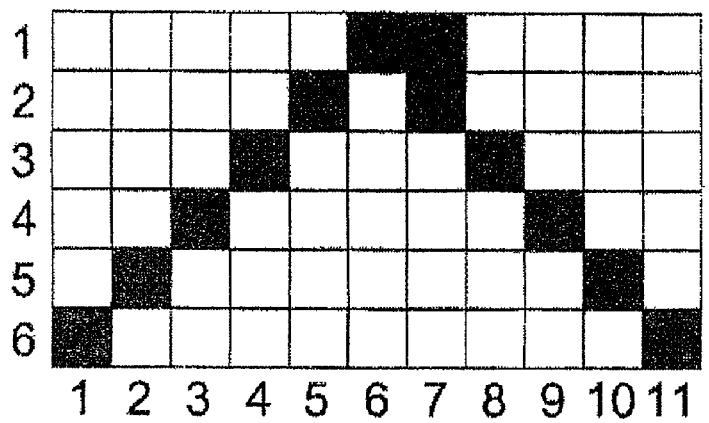
FIG. 14(b) is an example of a detection block in which representative pixels are arranged in a V-shaped layout.
Figure 14C:
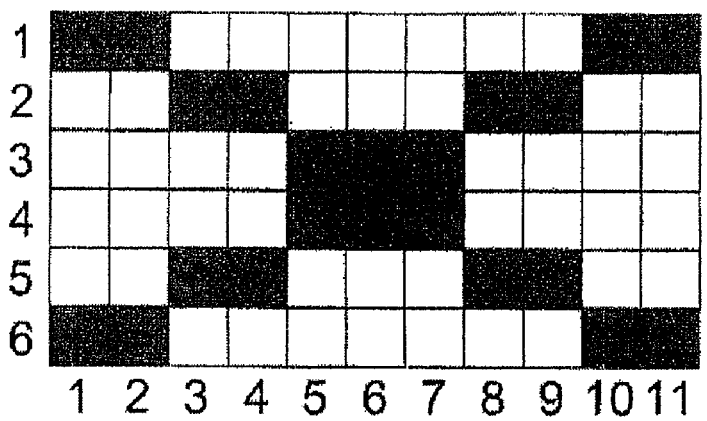
FIG. 14(c) is an example of a detection block in which representative pixels are arranged in a X-shaped layout.

Other possible arrangements of representative pixels include the inverted V-shaped layout shown in FIG. 14(b) and the X-shaped layout (a continuous arrangement of pixels along the two diagonals within the detection block) shown in FIG. 14(c). Since all four vertices of the detection block are included in determinations based on the X-shaped layout, this arrangement further reduces the likelihood of error without greatly increasing the number of representative pixels. That is, while a diagonal band-like image not wide enough to fill the detection block may be misinterpreted as a banding image when using the diagonal line layout shown in FIG. 14(a), the X-shaped layout shown in FIG. 14(c) prevents such misinterpretation. The arrangements of representative pixels shown in FIGS. 14(a)-14(c) satisfies the condition that at least one representative pixel is positioned at each X coordinate and at least one representative pixel is positioned at each Y coordinate in the area targeted for banding image detection (the detection block).

3. Detailed Description of the Process

Next, steps executed by the inkjet printer 2 for implementing the above process will be described.

Figure 15:
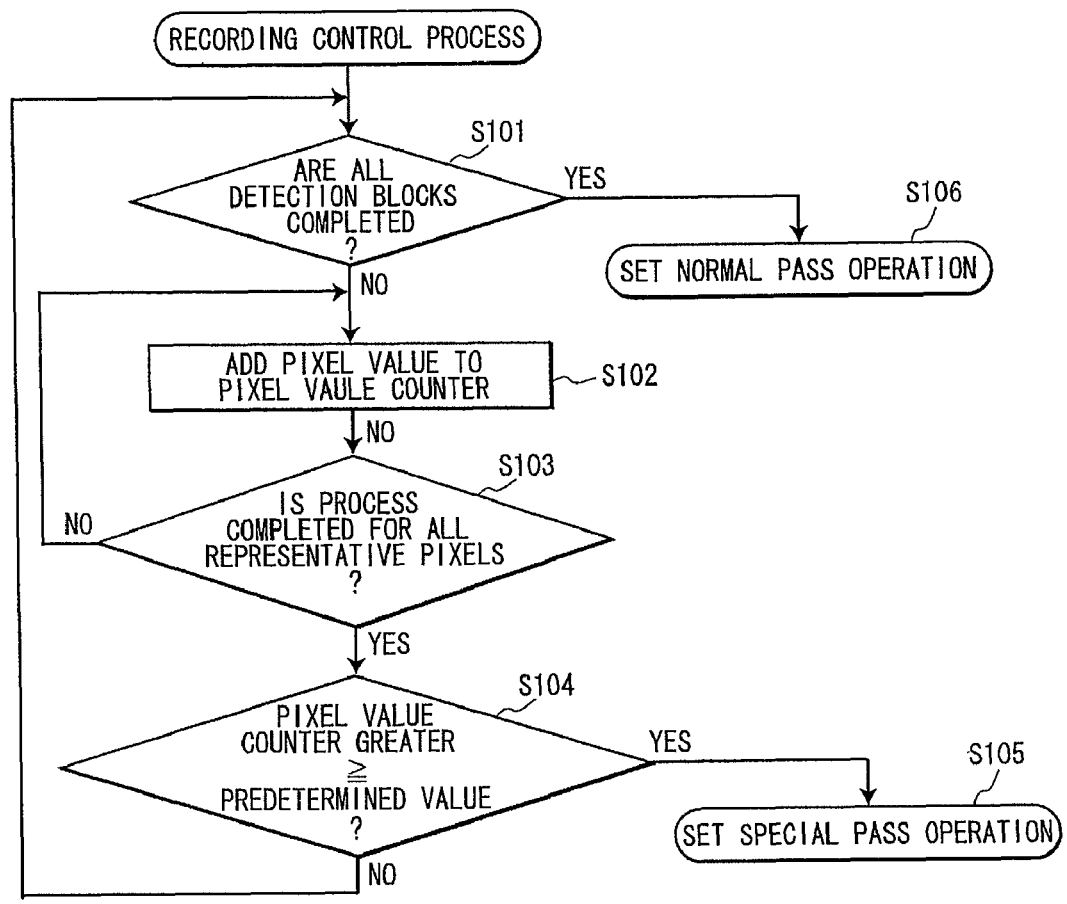
FIG. 15 is a flowchart illustrating steps in a recording control process according to the embodiment.

FIG. 15 is a flowchart illustrating steps in a recording control process executed by the control unit 21 of the inkjet printer 2 (and specifically the CPU 211) according the recording control program when the inkjet printer 2 receives image data (256-level RGB data) in units of scanning region from the PC 1. The recording control process is performed on four-level C, M, Y, and K image data generated by first performing a color conversion process on image data received from the PC 1 and subsequently performing a halftone process on the data resulting from color conversion.

In S101 at the beginning of the recording control process, the control unit 21 determines whether the process in S102-S104 described below has been completed for all detection blocks in the targeted scanning region (the scanning region represented by the image data received from the PC 1.

If the control unit 21 determines that the following process has not been performed for all detection blocks in the current scanning region (i.e., that there remain one or more unprocessed detection blocks), the control unit 21 selects one unprocessed detection block to be subjected to the process beginning from S102.

In S102 the control unit 21 selects one unprocessed representative pixel in the current detection block as the process target and adds a pixel value for this representative pixel corresponding to ink quantity to a pixel value counter. More specifically, in the embodiment, four pixel value counters are defined for C, M, Y, and K image data. The control unit 21 adds each pixel value of C, M, Y, and K image data to a corresponding one of four pixel value counters.

In S103 the control unit 21 determines whether the process in S102 has been completed for all representative pixels in the current detection block.

If the control unit 21 determines in S103 that the process has not been completed on all representative pixels in the target detection block (i.e., when one or more unprocessed representative pixels exist), the control unit 21 returns to S102.

If the control unit 21 determines in S103 that all representative pixels in the current detection block have been processed, in S104 the control unit 21 determines whether the pixel value counters holding the cumulative value of pixel values for all representative pixels in the current detection block is greater than or equal to prescribed determination reference values. The following determinations (A)-(D) describe specific methods for making this determination.

(A) Determine whether all CMYK colors meet the condition that the cumulative value for each color is greater than or equal to a first prescribed determination reference value set for each color. Here, the cumulative value for each color is a value of the pixel value counter corresponding to the color obtained the processes S101-S104. The first determination reference values are independently defined for four colors C, M, Y, and K.

(B) Determine whether at least one of the CMYK colors meets the condition that the cumulative value of the color is greater than or equal to a second prescribed determination reference value set for that color. The second determination reference values are independently defined for four colors C, M, Y, and K.

(C) Determine whether the sum of the cumulative value for C (a value of the pixel value counter for color C) and the cumulative value for M (a value of the pixel value counter for color M) is greater than or equal to a third predetermined determination reference value. Here, Y is excluded because yellow does not produce noticeable color banding.

(D) Determine whether the cumulative value for K (a value of the pixel value counter for color K) is greater than or equal to a fourth prescribed determination reference value and whether the sum of the cumulative value for C and the cumulative value for M is greater than or equal to a fifth determination reference value.

Since the optimum value of the determination reference values differ according to the actual printer, ink, paper, resolution, and the like being used, it is preferable to find a design value on a case-by-case basis. Further, the methods described in (A)-(D) above are merely examples. The methods (A)-(D) may be combined through OR operations and/or AND operations, or conditions within the methods (A)-(D) may be used selectively. Of course, a determination method other than (A)-(D) may also be used.

For example, the following determination (E) may be used. That is, in addition to the four pixel value counters, four last line counters may be defined for C, M, Y, and K image data. In this case, if the selected representative pixel is positioned at last line of the detection region (the representative pixels bordering the next scanning region), in S102 the control unit 21 further adds each pixel value of C, M, Y, and K image data to a corresponding one of four pixel value counters. Here, in the embodiment, the representative pixel that is positioned at last line of the detection region is adjacent to the $(N+1)^{th}$ scanning region, that is, a representative pixel having a Y coordinate value 6 (see FIG. 14(*a*)-14(*c*)). For example, the representative pixel at (11, 6) shown in FIG. 13(*a*) is positioned at last line of the detection region. Because the last line of pixels is likely to have the greatest influence on banding, the control unit 21 counts the four last line counters and determines the following determination (E):

(E) Determine whether the cumulative values (at least one of values of four last line counters) in only the last line of the scanning region are greater than or equal to corresponding determination reference values. Specifically, the determination (E) may be found by performing the AND operation on the following determination (E-A)-(E-D):

(E-A) Determine whether all CMYK colors meet the condition that the cumulative value (value of the four last line counters) for each color is greater than or equal to a sixth prescribed determination reference value set for each color. The sixth determination reference values are independently defined for four colors C, M, Y, and K.

(E-B) Determine whether at least one of the CMYK colors meets the condition that the cumulative value of the color is greater than or equal to a seventh prescribed determination reference value set for that color. The seventh determination reference values are independently defined for four colors C, M, Y, and K.

(E-C) Determine whether the sum of the cumulative value for C (a value of the last line counter for color C) and the cumulative value for M (a value of the last line counter for color M) is greater than or equal to a eighth prescribed determination reference value. Here, Y is excluded because yellow does not produce noticeable color banding.

(E-D) Determine whether the cumulative value for K (a value of the pixel value counter for color K) is greater than or equal to a ninth prescribed determination reference value and whether the sum of the cumulative value for C and the cumulative value for M is greater than or equal to a tenth determination reference value.

When the determination (E) ((E-A)-(E-D)) is performed, the methods (A)-(E) may be combined through OR operations and/or AND operations, or conditions within the methods (A)-(E) may be used selectively.

If the control unit 21 determines in S104 that the pixel value counter is greater than or equal to the determination reference value, in S105 the control unit 21 sets the recording operation for the next $((N+1)^{th})$ scanning region following the target ($N^{th}$) scanning region to a special pass operation for recording in the same scanning direction used for the $N^{th}$ scanning region. Subsequently, the control unit 21 ends the current recording control process.

On the other hand, the control unit 21 returns to S101 when determining in S104 that the pixel value counter is less than the determination reference value. If there remain any unprocessed detection blocks at this time, the control unit 21, in S101, sets an unprocessed detection block as a target and repeats the process from S102 while targeting the next detection block. In other words, the control unit 21 shifts between detection blocks in sequence along the main scanning direction while determining whether a banding image exists based on representative pixels within each detection block.

However, if the control unit 21 determines in S101 that the process in S102-S104 has been completed for all detection blocks in the targeted scanning region (i.e., when the control unit 21 has processed all detection blocks without setting the recording operation to the special pass operation), in S106 the control unit 21 sets the recording operation for the $(N+1)^{th}$ scanning region to the normal pass operation for recording in a scanning direction different from that for the $N^{th}$ scanning region. Subsequently, the control unit 21 ends the current recording control process.

4. Effects of the Embodiment

As described above, the inkjet printer 2 according to the embodiment determines the existence of a banding image based solely on representative pixels (a portion of the pixels) rather than all pixels in the detection block, thereby reducing the process time required for preventing banding. Since the inkjet printer 2 arranges representative pixels so that one or more representative pixels exist at each X coordinate and at each Y coordinate in the detection block, erroneous determinations are less likely to occur than when the representative pixels are distributed unevenly.

Further, by determining the presence of a banding image based solely on pixels within one scanning region, the inkjet printer 2 can quickly set the scanning direction for recording the scanning region. If a device attempts to detect a banding image that covers a plurality of scanning regions, the device must buffer the plurality of scanning regions simultaneously, not only requiring a large amount of memory, but also lengthening the process time. However, since the inkjet printer 2 of the embodiment detects the presence of a banding image based solely on pixels within a single scanning region, such issues with memory and process time can be avoided.

5. Modifications

While the invention has been described in detail with reference to the embodiment thereof, it would be apparent to those skilled in the art that various changes and modifications may be made therein without departing from the spirit of the invention.

The inkjet printer 2 in the embodiment described above performs the recording control process on four level CMYK data obtained after the halftone process is performed. However, the inkjet printer 2 may perform the recording control process on 256-level CMYK data before the halftone process is performed.

Further, while the detection blocks are set to a size equal to the reference size in the embodiment described above, the detection blocks may be set to half the width of the reference size. In this case, the inkjet printer 2 can reliably detect banding images of a smaller size (a size approaching the reference size).

In the embodiment described above, when the inkjet printer 2 detects a banding image in the lower region of the $N^{th}$ scanning region on the border with the $(N+1)^{th}$ scanning region (i.e., the bordering area), the inkjet printer 2 controls recording so that the $(N+1)^{th}$ scanning region is scanned in the same direction as the $N^{th}$ scanning region, but the invention is not limited to this control. For example, when the inkjet printer 2 conversely detects a banding image in the upper area of the $N^{th}$ scanning region on the border with an $(N-1)^{th}$ scanning region, the inkjet printer 2 can control recording so that the $N^{th}$ scanning region is scanned in the same direction as the $(N-1)^{th}$ scanning region.

In the embodiment described above, the recording unit 26 is an inkjet device that records images using ink in the four colors C, M, Y, and K, but the invention may be applied to an inkjet recording device that employs a larger number of ink colors.

Further, the inkjet printer 2 serves as the recording control system of the invention in the embodiment described above, but the invention is not limited to this configuration. For example, the PC 1 (printer driver 123) may be configured to perform some or all of the process implemented by the recording control system of the invention.

What is claimed is:

1. A recording control system controlling an inkjet recording operation for recording an image by controlling a recording head based on image data indicating the image, the recording head having a plurality of nozzle rows and being configured to be capable of scanning in a first direction and a second direction opposite to the first direction, the plurality of nozzle rows corresponding to a plurality of colors, each nozzle row including a plurality of nozzles that are arranged in a direction intersecting with the first and second directions and that are configured to eject ink of corresponding color, the image including a plurality of pixels, the image data having a plurality of sets of pixel data corresponding to the plurality of pixels, each set of pixel data including a pixel value representing color of a corresponding pixel and indicating an amount of ink of the color, the recording control system comprising:

a setting unit that sets, in the image, a first region and a second region adjacent to the first region and that sets a detection region in one of the first and second regions, a selecting unit that selects at least one pixel from among the pixels in the detection region such that a number of the selected at least one pixel is smaller than a total number of the pixels existing in the detection region;

a determining unit that determines whether a pixel value of the selected at least one pixel satisfies a criterion;

a control unit that controls the recording head to eject ink based on pixel data corresponding to pixels in the first region while controlling the recording head to scan in the first direction such that the recording head records the image in the first region, the control unit controlling the recording head to eject ink based on pixel data corresponding to pixels in the second region while controlling the recording head to scan in the first direction such that the recording head records the image in the second region when the determining unit determines that the pixel value of the selected at least one pixel satisfies the criterion, the control unit controlling the recording head to eject ink based on pixel data corresponding to pixels in the second region while controlling the recording head to scan in the second direction such that the recording head records the image in the second region when the determining unit determines that the pixel value of the selected at least one pixel does not satisfy the criterion; and an accumulating unit that obtains an accumulation value by accumulating the pixel value for the selected at least one pixel, wherein the determining unit determines that the pixel value of the selected at least one pixel satisfies the criterion when the accumulation value is greater than or equal to a predetermined value, and wherein the determining unit determines that the pixel value of the selected at least one pixel fails to satisfy the criterion when the accumulation value is smaller than the predetermined value.

2. The recording control system according to claim 1, wherein the setting unit sets a plurality of representative pixels in the detection region, the plurality of the representative pixels being a part of the pixels in the detection region, a number of the plurality of the representative pixels being smaller than a total number of the pixels existing in the detection regions, wherein the selecting unit selects the at least one pixel from among the plurality of representative pixels.

3. The recording control system according to claim 2, wherein the plurality of pixels are arranged in the image in an x direction and a y direction, the position of each pixel being defined by an x coordinate value with respect to the x direction and a y coordinate value with respect to the y direction, wherein the setting unit sets the detection region such that the x coordinate values and the y coordinate values of all the pixels in the detection region are in an x detection range and in a y detection range, respectively, and wherein the setting unit sets the plurality of representative pixels in the detection region such that each x coordinate value in the x direction range is equal to the x coordinate value defining the position of at least one representative pixel and each y coordinate value in the y direction range is equal to the y coordinate value defining the position of at least one representative pixel.

4. The recording control system according to claim 2, wherein the representative pixels are arranged continuously in the detection region.

5. The recording control system according to claim 2, wherein the detection region is a rectangular shaped region, and wherein the representative pixels are arranged continuously along a diagonal line defined in the rectangular shaped region.

6. The recording control system according to claim 2, wherein the detection region is a rectangular shaped region, wherein the representative pixels are arranged continuously along a pair of diagonal lines in the rectangular shaped region.

7. The recording control system according to claim 2, wherein the selecting unit selects all the pixels from among the representative pixels.

8. The recording control system according to claim 1, wherein the setting unit sets the first region, the second region, and the detection region in the image such that all of the first, second, and detection region have rectangular shapes, one side of the detection region coinciding with a part of a border line between the first region and the second region.

9. The recording control system according to claim 8, wherein the selecting unit selects, among the pixels in the detection region, the at least one selected pixel that is adjacent to the one side of the detection region coinciding with the part of the boarder line.

10. The recording control system according to claim 1, wherein the setting unit sets the first region and the second region such that the first region and the second region are arranged in a direction orthogonal to the first and second directions.

* * * * *